(12) United States Patent
Nitsuma et al.

(10) Patent No.: US 8,136,878 B2
(45) Date of Patent: Mar. 20, 2012

(54) VEHICLE SEAT

(75) Inventors: Kenichi Nitsuma, Tochigi (JP); Takeshi Akutsu, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 173 days.

(21) Appl. No.: 12/669,652

(22) PCT Filed: Jul. 17, 2008

(86) PCT No.: PCT/JP2008/062918
§ 371 (c)(1),
(2), (4) Date: Jan. 19, 2010

(87) PCT Pub. No.: WO2009/011389
PCT Pub. Date: Jan. 22, 2009

(65) Prior Publication Data
US 2010/0194157 A1  Aug. 5, 2010

(30) Foreign Application Priority Data
Jul. 19, 2007 (JP) .................................. 2007-188889

(51) Int. Cl.
*B60N 2/42* (2006.01)
(52) U.S. Cl. ............................. 297/216.14; 297/216.13
(58) Field of Classification Search ............. 297/216.14, 297/216.13
See application file for complete search history.

(56) References Cited

U.S. PATENT DOCUMENTS

| 6,053,571 A * | 4/2000 | Faigle ........................ 297/216.13 |
| 6,296,306 B1 * | 10/2001 | Specht et al. ............. 297/216.14 |
| 7,488,035 B2 * | 2/2009 | Kawashima et al. ..... 297/216.14 |
| 2005/0077763 A1 * | 4/2005 | Kawashima ............. 297/216.14 |
| 2005/0140190 A1 * | 6/2005 | Kawashima ............. 297/216.14 |

FOREIGN PATENT DOCUMENTS

| GB | 2 359 482 A | 8/2001 |
| JP | S56-3235 Y2 | 1/1981 |
| JP | H04-14037 Y2 | 3/1992 |
| JP | H10-278644 A | 10/1998 |

* cited by examiner

*Primary Examiner* — Milton Nelson, Jr.
(74) *Attorney, Agent, or Firm* — Drinker Biddle & Reath LLP

(57) ABSTRACT

A vehicle seat comprises a seat frame comprising a lower frame connected to side frames, and a seating frame connected to the lower frame. A connecting structure is formed at a position remote from a rotate center as a connecting portion of an end side of the side frame to the lower frame; the connecting structure comprises an elongated hole formed in the applicable side frame and extending in an up-and-down direction, a convex portion formed on the lower frame, an energy absorbing plate, and a guide member for guiding the energy absorbing plate; and the convex portion and the elongated hole are configured to be relatively movable, while plastically deforming the energy absorbing plate which is supported in an abutting manner by a seating frame side of the convex portion and which is disposed in a clamped manner between the convex portion and the guide member.

26 Claims, 8 Drawing Sheets

FIG. 4A
FIG. 4B
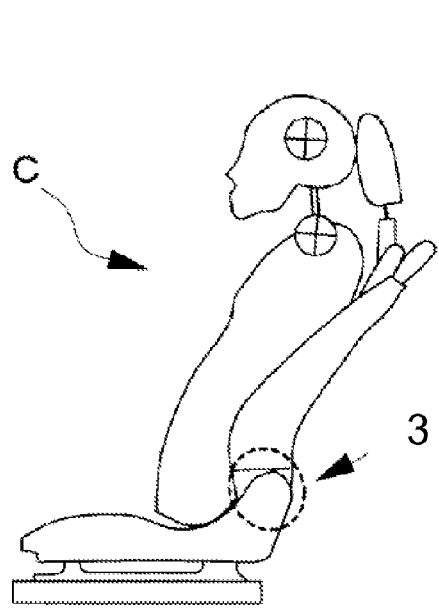
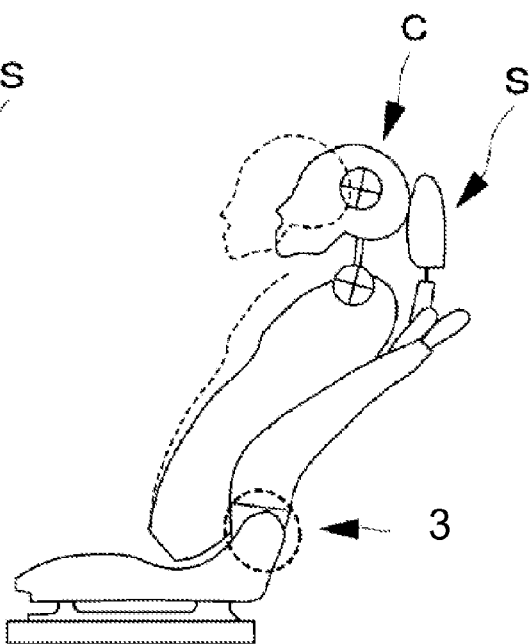

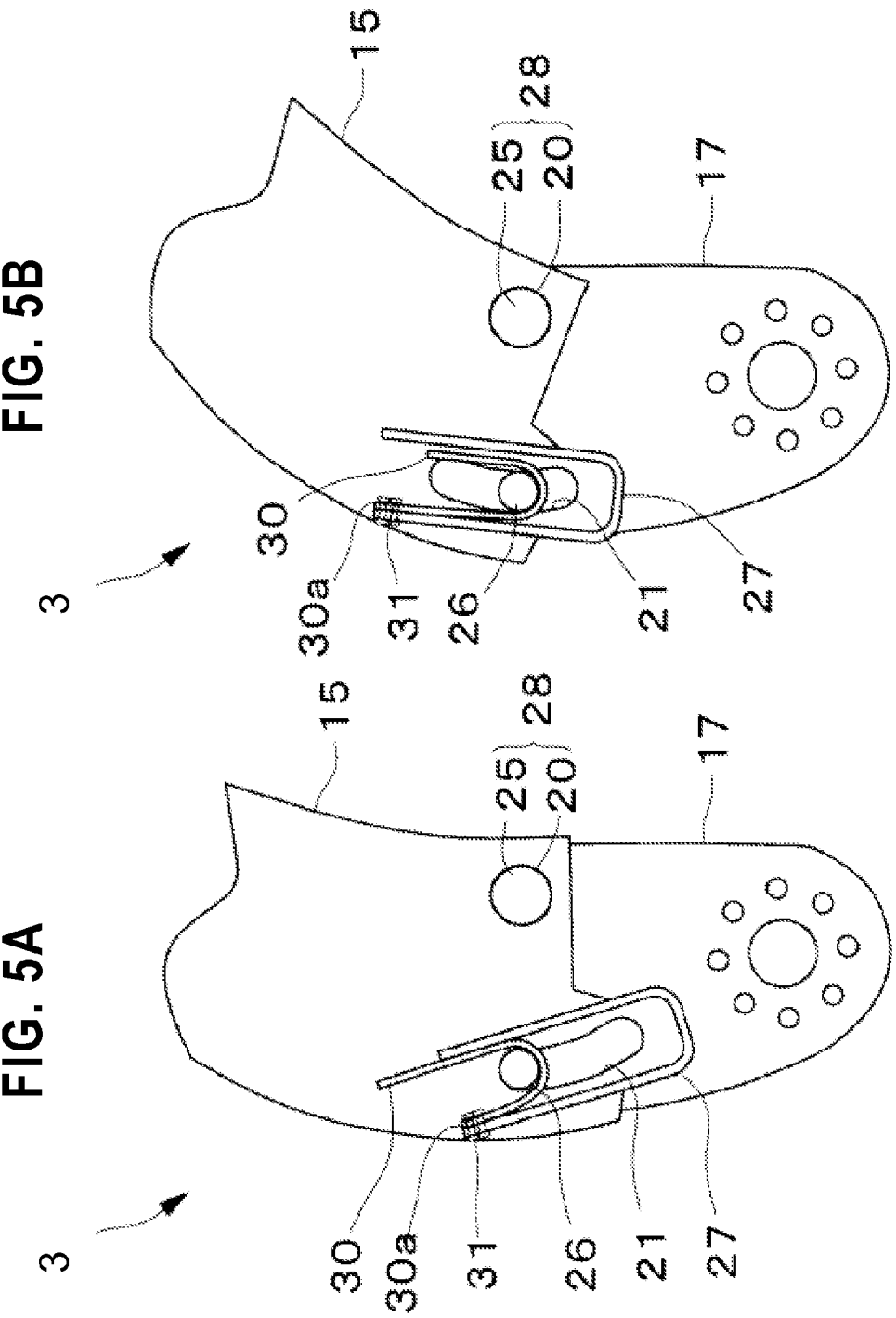

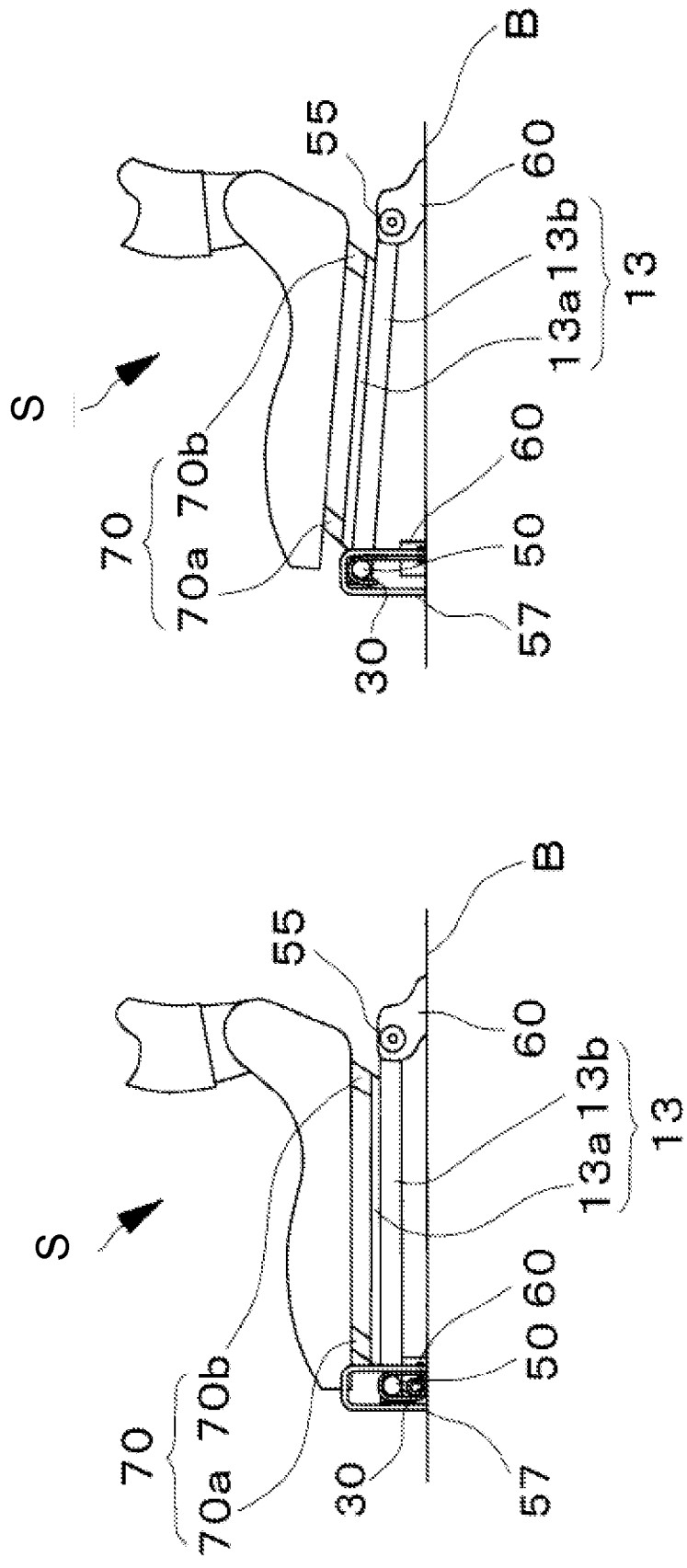

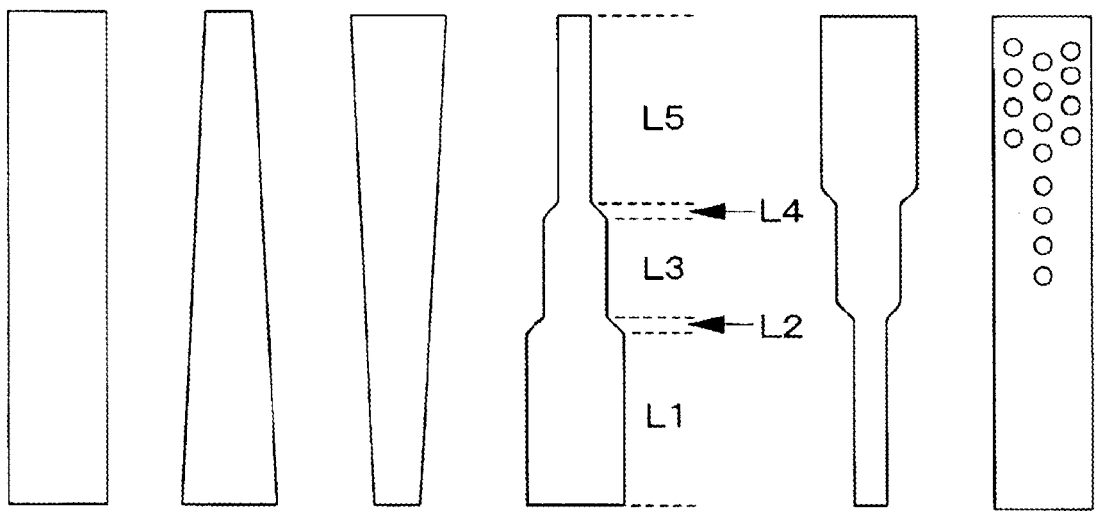

VEHICLE SEAT

CROSS-REFERENCE TO RELATED APPLICATIONS

This application is the U.S. national phase of the International Patent Application No. PCT/JP2008/062918 filed Jul. 17, 2008, which claims the benefit of Japanese Patent Application No. 2007-188889 filed Jul. 19, 2007, the entire content of which is incorporated herein by reference.

BACKGROUND

The present invention relates to a seat frame and a vehicle seat, and particularly to a seat frame and a vehicle seat that reduces an impactive shock that would otherwise be applied to a neck portion upon a rear-end collision.

Conventionally, upon so-called rear-end collision such as a collision against a rear portion of a vehicle, and collision of a vehicle during rearward movement thereof, it is likely that a head portion of a seating occupant is suddenly tilted rearward due to inertial movement such that a neck portion of the occupant is likely to be subjected to an impactive shock.

Thus, seats for vehicles such as automobiles are each provided with a headrest located above a seat-back and configured to receive a head portion of an occupant from the rearward, so as to protect the head portion, a neck portion, and the like of the occupant and to mitigate an impact against the head portion upon rear-end collision.

However, even with the provision of the headrest, it is sometimes impossible to sufficiently mitigate an impactive shock that is otherwise applied to the neck portion of the occupant, in case of an excessive impact energy upon rear-end collision so that the head portion of the occupant is subjected to an increased impact from the headrest.

To solve such a problem, there has been proposed a technique configured to apply a resistance force from an impact absorbing element that is produced by successive and stepwise breaking deformations of impact absorbing holes with an engagement pin, to a seat-back frame, upon rearward tilting of the seat-back frame relative to a rotational arm, thereby enabling absorption of impact energy upon rear collision (see Japanese unexamined patent publication no. 1998-278644 ("the '644 Publication"), for example).

Further, there has been proposed another technique configured such that a front portion and a rear portion of a substantially rectangular connecting member formed of a material such as soft iron having a larger deformation resistance are attached to a front portion of a rail of a seat leg portion and to a vehicular body floor around the seat leg portion, respectively, while providing a rotational hinge portion at a rear end portion of the rail, in a manner to absorb an impact energy upon rear-end collision via deformation of the connecting member (see Great Britain patent document no. GB2359482A ("the '482 Publication"), for example).

However, according to the technique proposed by the '644 Publication, absorption of impact is intermittently conducted upon breakage of partitions among impact absorbing holes, thereby problematically failing to attain a remarkable impact mitigating effect.

Further, in case of the configuration proposed by the '482 Publication, it is impossible to absorb an impact upon exceeding an extent of deformation of the connecting member, thereby problematically failing to sufficiently absorb a strong impact.

SUMMARY

In view of the above problems, it is therefore an object of the present invention to provide a vehicle seat capable of absorbing an impact energy upon rear-end collision, to thereby effectively mitigate an impactive shock against a neck portion of an occupant.

It is another object of the present invention to provide a vehicle seat capable of mitigating an impactive shock that is otherwise applied to the neck portion, at a lower cost and a simpler configuration.

The above problems are solved by a vehicle seat comprising: a seat frame comprising: side frames separated from each other at least in a right-and-left direction and extending in an up-and-down direction; a lower frame connected to the side frames; and a seating frame connected to the lower frame; wherein the side frames are disposed to be rotatable relative to the seating frame; the vehicle seat further comprising: a connecting structure formed at a position remote from a rotate center of the side frames at end sides thereof the connecting structure comprising: an elongated hole formed in the applicable side frame and extending in an up-and-down direction; a convex portion formed on the lower frame; an energy absorbing plate; and a guide member for guiding the energy absorbing plate, wherein the convex portion and the elongated hole are configured to be relatively movable, while plastically deforming the energy absorbing plate which is supported, in an abutting manner, by a seating frame side of the convex portion and which is disposed, in a clamped manner, between the convex portion and the guide member.

The above problems are solved by a vehicle seat comprising: a seat frame comprising: side frames separated from each other at least in a right-and-left direction and extending in an up-and-down direction; a lower frame connected to the side frames; and a seating frame connected to the lower frame, wherein the side frames are disposed to be rotatable relative to the seating frame; the vehicle seat further comprising: a connecting structure formed at a position remote from a rotate center of the side frames at end sides thereof, wherein the connecting structure comprises: a convex portion formed on the applicable side frame; an elongated hole formed in the lower frame and extending in an up-and-down direction; an energy absorbing plate; and a guide member for guiding the energy absorbing plate, wherein the convex portion and the elongated hole are configured to be relatively movable, while plastically deforming the energy absorbing plate which is supported, in an abutting manner, by a seating frame side of the convex portion and which is disposed, in a clamped manner, between the convex portion and the guide member.

The above problems are solved by a vehicle seat comprising: a seat frame comprising at least: a seat-back frame; and a seating frame connected to the seat-back frame through a connecting bracket, wherein the seat-back frame is disposed to be rotatable relative to the seating frame; the vehicle seat further comprising: a connecting structure formed at a position remote from a rotate center of the seat-back frame at an end side thereof, wherein the connecting structure comprises: an elongated hole formed in the connecting bracket; a convex portion formed on the seating frame; an energy absorbing plate; and a guide member for guiding the energy absorbing plate, wherein the convex portion and the elongated hole are configured to be relatively movable, while plastically deforming the energy absorbing plate which is supported, in an abutting manner, by a moving direction end side of the convex portion and which is disposed, in a clamped manner, between the convex portion and the guide member.

The above problems are solved by a vehicle seat comprising: a seat frame comprising at least: a seat-back frame; and a seating frame connected to the seat-back frame through a connecting bracket, wherein the seat-back frame is disposed to be rotatable relative to the seating frame; the vehicle seat further comprising: a connecting structure formed at a position remote from a rotate center of the seat-back frame at an end side thereof, wherein the connecting structure comprises: a convex portion formed on the connecting bracket; an elongated hole formed in the seating frame; an energy absorbing plate; and a guide member for guiding the energy absorbing plate, wherein the convex portion and the elongated hole are configured to be relatively movable, while plastically deforming the energy absorbing plate which is supported, in an abutting manner, by a moving direction end side of the convex portion and which is disposed, in a clamped manner, between the convex portion and the guide member.

The above problems are solved by a vehicle seat comprising: a seat frame having a seating frame; a rotate shaft formed between a rear end side of the seating frame side and a vehicle floor side; and a connecting structure formed between a front end side of the seating frame side and the vehicle floor side; wherein the connecting structure comprises: a convex portion formed on the seating frame side; an energy absorbing plate; and a guide member fixed to the vehicle floor side to movably guide the convex portion, wherein the convex portion is configured to be movably guided by the guide member, while plastically deforming the energy absorbing plate which supported, in an abutting manner, a moving direction end side of the convex portion and which is disposed, in a clamped manner, between the convex portion and the guide member.

The above problems are solved by a vehicle seat comprising: a seat frame having a seating frame; a rotate shaft formed between a rear end side of the seating frame side and a vehicle floor side; and a connecting structure formed between a front end side of the seating frame side and the vehicle floor side, wherein the connecting structure comprises: a convex portion formed on the vehicle floor side; an energy absorbing plate; and a guide member fixed to the seating frame side to movably guide the convex portion, wherein the convex portion is configured to be movably guided by the guide member, while plastically deforming the energy absorbing plate which supported, in an abutting manner, a moving direction end side of the convex portion and which is disposed, in a clamped manner, between the convex portion and the guide member.

As described above, it is possible to provide the vehicle seat wherein the energy absorbing plate is guided by the guide member, and the convex portion moves or relatively moves while plastically deforming the energy absorbing plate by a load of the convex portion in a manner to allow for movement of the seat frame, to absorb an impact energy upon rear-end collision.

At this time, it is preferable that the seating frame side is one of a leg portion for supporting the seating frame, and a slide rail at the seating frame side. In this way, it is possible to adopt, as a movable side, the leg portion supporting the seating frame, or the slide rail at the seating frame side, thereby increasing a freedom of design.

Further, the energy absorbing plate is a metal plate configured to be plastically deformed by application of a rear-end collision load to the convex portion. Moreover, it is preferable that the energy absorbing plate is a metal plate which is made variable in absorption energy by varying a thickness, width, and/or material of the plate. In this way, it is possible to select a thickness, width, and/or material of the energy absorbing plate to be plastically deformed by the convex portion in a manner to provide the energy absorbing plate preferably adapted to a size or the like of a vehicle, thereby enabling to provide a vehicle seat equipped with a seat frame suitable for each type of the vehicle.

Further, the energy absorbing plate can be configured to be in a stepwise changed shape. In this way, stepwise changing the plate shape enables configuration of the plate to stepwise absorb collision energy.

According to this seat frame and vehicle seat, it is possible to plastically deform the energy absorbing plate to effectively absorb an energy upon rear-end collision, thereby mitigating an impactive shock against a neck portion of an occupant. It is further possible to adjust the energy absorbing plate to stepwise absorb energy upon rear-end collision commensurately with a speed change.

Further, the energy absorbing plate is configured to absorb an energy upon rear-end collision, so that the connecting structure is space-saving/light-weight, and the connecting structure can be configured into a unit comprising the convex portion, guide member, and energy absorbing plate, so that the connecting structure can be readily replaced after collision.

BRIEF DESCRIPTION OF DRAWINGS

Various embodiments of the invention are illustrated in the following drawings and discussed below.

FIGS. 4A, B are explanatory side views conceptually showing states of the vehicle seat according to the first embodiment of the present invention before and during rear-end collision;

FIGS. 5A, B are partially enlarged explanatory side views of the connecting structure of the seat frame according to the first embodiment of the present invention, before and during rear-end collision;

FIGS. 7A, B are side views showing states of a seating frame side of a seat frame and a vehicle floor side according to a third embodiment of the present invention, before and during rear-end collision; and FIGS. 8A-F are front views illustrating shapes for the energy absorbing plate.

DETAILED DESCRIPTION OF THE EMBODIMENTS

Embodiments of the present invention will be described hereinafter with reference to the drawings. The members, arrangements, and the like to be described hereinafter are not intended to restrict the present invention, and can be of course variously modified without departing from the spirit or scope of the present invention.

First Embodiment

Figure 1:
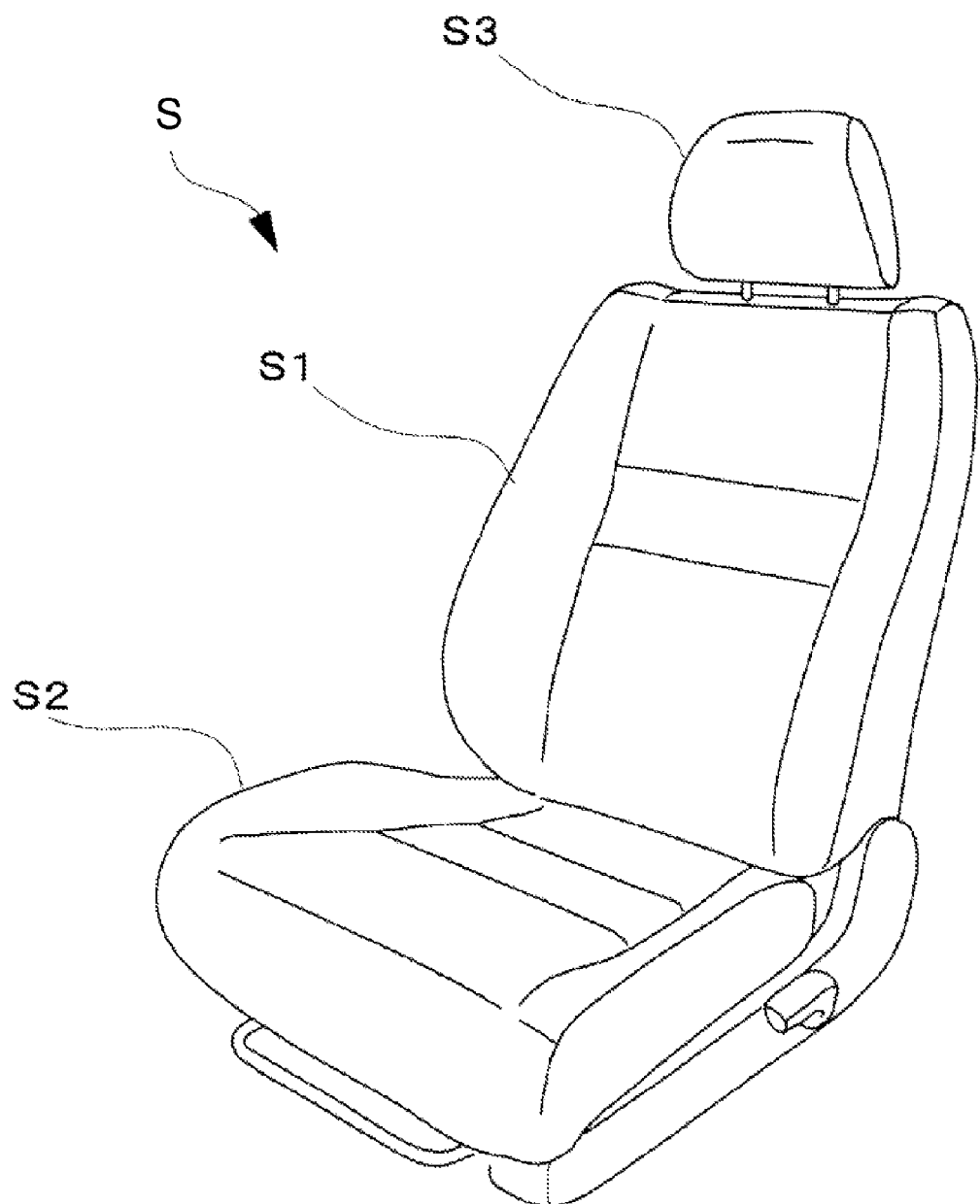
FIG. 1 is an external perspective view of a vehicle seat according to a first embodiment of the present invention.

The vehicle seat S according to this embodiment comprises a seat-back S1, a seating portion S2, and a headrest S3 as shown in FIG. 1.

Figure 2:
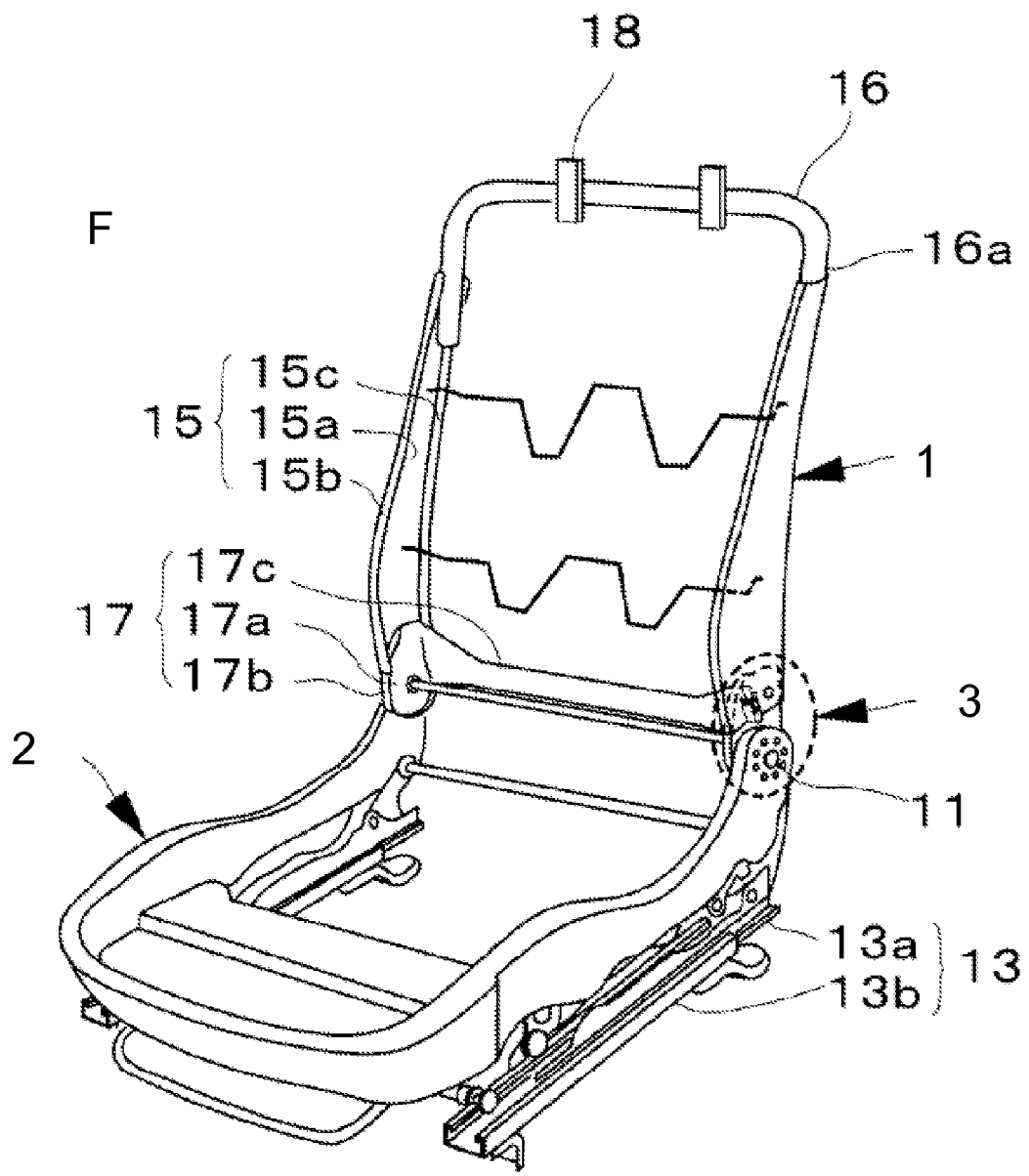
FIG. 2 is a schematic perspective view of a seat frame according to the first embodiment of the present invention.

As shown in FIG. 2, the vehicle seat S includes a seat frame F comprising a seat-back frame 1 of the seat-back S1, and a seating frame 2 of the seating portion S2.

The seating frame 2 is covered with a cushion member, an outer cover, and the like (not shown), and supports an occupant C from below. The seating frame 2 is supported by leg portions thereof, and these leg portions have inner rails 13a attached thereto, respectively, such that the inner rails are combined with outer rails 13b mounted on a vehicular body floor and are assembled into slide rails 13, respectively, which allow for positional adjustment in a fore-and-aft direction.

The seat-back frame 1 is rotatably connected to a rear end portion of the seating frame 2, through a reclining mechanism 11.

The seat-back frame 1 is covered with a cushion member and the like (not shown) in a manner to support a back side of the occupant C from the rear, and is configured into a substantially rectangular frame body in this embodiment. More specifically, the seat-back frame 1 comprises: two side frames 15 arranged to be separated from each other in a right-and-left direction and extending in an up-and-down direction; an upper frame 16 for connecting upper end sides of the side frames 15 to each other; and a lower frame 17 for connecting lower end sides of the side frames 15 to each other.

The side frames 15 are extension members constituting lateral sides of the seat-back frame 1, respectively, and each include a side plate 15a in a planar shape, a front edge 15b inwardly folded back into a U-shape from a front end of the side plate 15a, and a rear edge 15c inwardly bent into an L shape from a rear end of the side plate 15a.

The upper frame 16 is a member in a substantially rectangular channel shape, and includes lateral side portions 16a disposed to be partially overlapped with side plates 15a of the side frames 15, respectively, such that the upper frame 16 is fixedly joined to the side frames 15 at these overlapping portions.

Disposed above the seat-back frame 1 is a headrest frame (not shown). The headrest S3 is constructed by providing a cushion member at an outer periphery of the headrest frame, and by covering an outer periphery of the cushion member with a surface member. The headrest S3 is disposed by supporting the pillars of the headrest frame by pillar supporting parts 18 provided at the front portion of the upper frame 16.

The lower frame 17 is a member having a cross section in a substantially rectangular channel shape for constituting a lower side of the seat-back frame 1, and includes side plates 17a in planar shapes arranged to be separated from each other in a right-and-left direction, edges 17b inwardly folded back into L shapes from front end portions of the side plates 17a, respectively, and a rear plate 17c for connecting the right and left side plates 17a to each other from rear end portions of the side plates 17a.

As described above, the lower frame 17 is connected at its lower side to the rear end portion of the seating frame 2 through the reclining mechanism 11, and is in turn connected at its upper side to the side frames 15 through a rotate shaft 28 to be described below.

Figure 3:
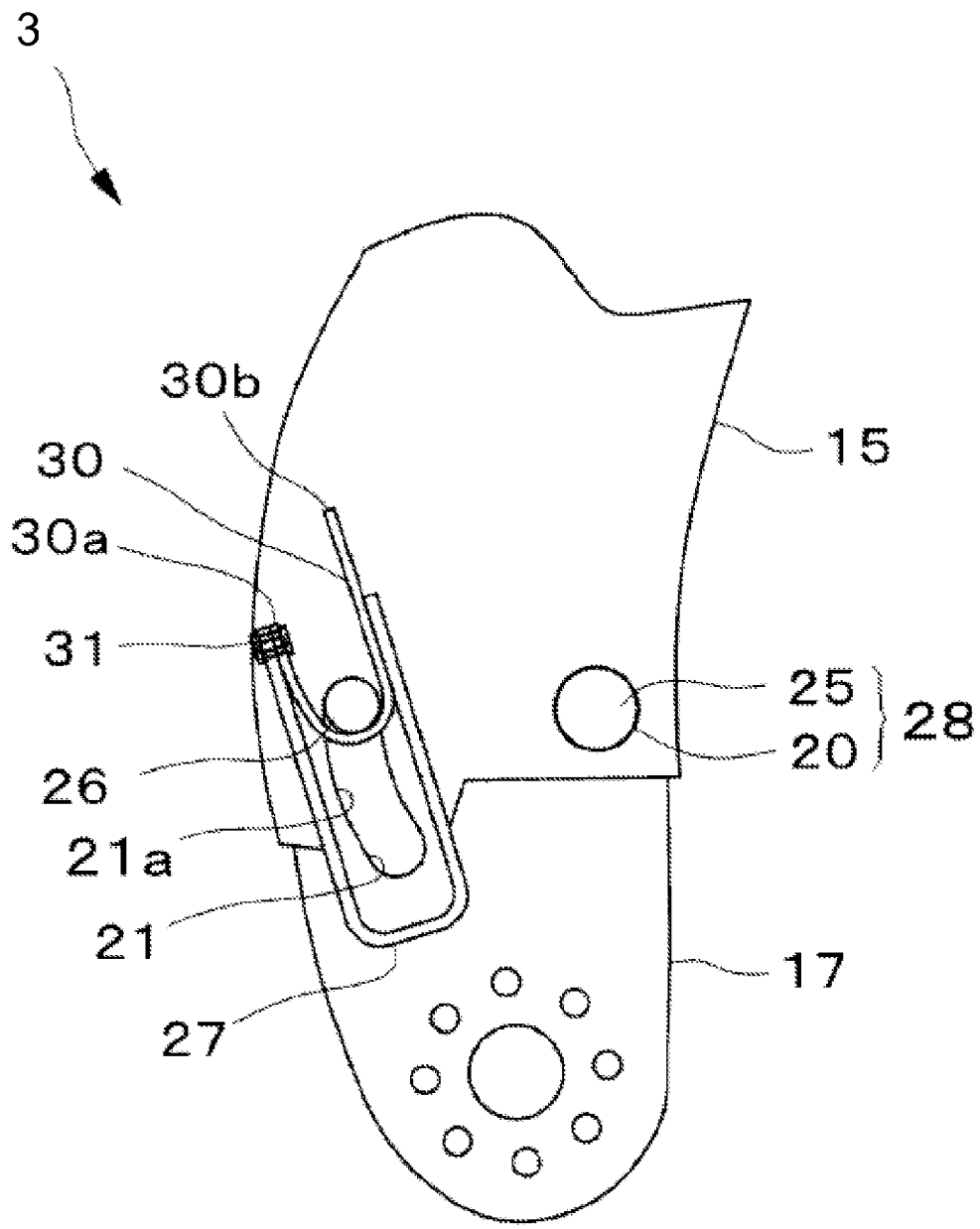
FIG. 3 is a side view of a connecting structure between a lower frame and a side frame according to the first embodiment of the present invention.

FIG. 3 is a side view showing a connecting structure 3 between the lower frame 17 and the applicable side frame 15.

The connecting structure 3 comprises: a fitting hole 20 provided at the side frame 15; the rotate shaft 28 for penetrating through the fitting hole 20, to connect the side frame 15 and lower frame 17 to each other; an elongated hole 21 formed into an arcuate shape formed at the side frame 15; a convex portion 26 affixed to the lower frame 17 and penetrating through and protruding from the elongated hole 21; and a guide member 27 in a substantially rectangular channel shape, in a manner to surround the elongated hole 21.

Further disposed inside the guide member 27 is an energy absorbing plate 30 in a thin plate shape, in a manner to go around the convex portion 26.

In this embodiment, the rotate shaft 28 and the convex portion 26 are arranged at a rear side and a front side, respectively.

The fitting hole 20 is formed into a circular shape having an inner diameter through which an outer diameter of the shaft member 25 is insertable without a gap therebetween, and is provided at the side plate of the side frame 15. The cylindrical shaft member 25 fixedly joined to the lower frame 17 is penetrated through the fitting hole to thereby rotatably support the side frame 15.

The rotate shaft 28 comprises the circular fitting hole 20 provided at the side frame 15, and the cylindrical shaft member 25 fixedly joined to the lower frame 17, and the shaft member 25 is penetrated through the fitting hole 20 to rotatably support the side frame 15.

Although the fitting hole 20 is formed into a circular shape in this embodiment, the fitting hole 20 may also be configured into a substantially rectangular shape so that the shaft member 25 is movable within the fitting hole 20.

The elongated hole 21 is an arcuate fitting hole provided at the side plate 15a of the applicable side frame 15, and the arcuate shape is formed to have a width slightly larger than an outer diameter of the convex portion 26. The elongated hole has an arcuate portion 21a formed to depict a part of a circle concentric with the rotate shaft 28.

The convex portion 26 is a cylindrical body fixedly joined to the lower frame 17, and is disposed to penetrate through the arcuate elongated hole 21 provided at the side frame 15 and to protrude beyond the lateral side of the side frame 15.

Although the convex portion 26 is formed into the cylindrical body finished to have a smooth surface, the convex portion may also be configured into a polygonal column, or may have a surface formed with a rasp pattern.

The elongated hole 21 is rotated together with the side frame 15 rotatably supported by the rotate shaft 28, and is configured so that the convex portion 26 fitted into the elongated hole 21 abuts onto an upper end and a lower end of the arcuate elongated hole 21 to thereby define an upper limit and a lower limit of the rotational amount.

The guide member 27 is in a substantially rectangular channel shape for guiding the energy absorbing plate 30, and is formed of a single piece of rectangular plate material. The guide member is configured to have a strength which is not easily deformed, and is fixedly joined to the applicable side frame 15 in a manner to surround the elongated hole 21 while upwardly directing an open end of the substantially rectangular channel shape. Further, the guide member is disposed to clamp the energy absorbing plate 30, which is described below and which is arranged to go around the underside of the convex portion 26 in a U-shaped manner, while leaving an appropriate spacing between the guide member and energy absorbing plate.

Although this embodiment adopts the guide member 27 in the substantially rectangular channel shape having the upwardly directed open end, the guide member may be formed of two rectangular plate materials disposed parallel to each other, and the guide member is not limited to plate-like members insofar as being configured to clamp the energy absorbing plate 30 arranged in a U-shaped manner around the convex portion 26 while leaving an appropriate spacing between the guide member and the energy absorbing plate. For example, the guide member 27 may comprise a semicircular body, a combination of a plurality of cylindrical bodies (protrusions), or the like, disposed around the convex portion 26.

The energy absorbing plate 30 is established by forming a plate material made of steel, hard resin, or the like into a rectangular shape, and the energy absorbing plate is disposed inside the guide member 27 such that a fixed end 30a as one end of the energy absorbing plate 30 is fixed to an inner end portion of the guide member 27 by a screw 31 that threads through them, and such that the energy absorbing plate is abutted to a seating portion side of the convex portion 26, to go around the convex portion 26 in a U-shaped manner. Namely, the energy absorbing plate 30 is disposed in the U-shaped manner, and is mounted so that the convex portion 26 is abutted on an inner bottom of this U shape.

Further, the energy absorbing plate 30 includes an other end as an unfixed free end 30b extended in a direction opposite to a relative moving direction of the convex portion 26.

At an initial position, i.e., in a state before the applicable side frame 15 is rearwardly rotated, the convex portion 26 is arranged at the upper end portion of the elongated hole 21. This enables the side frame 15 rotatably and tiltably supported by the rotate shaft 28, to rotate rearward within an extent that the convex portion 26 is movable along the elongated hole 21.

Here, since the energy absorbing plate 30 supports, in an abutting manner, the seating frame 2 side of the convex portion 26 while the convex portion 26 is arranged in a state abutted to the upper end portion of the elongated hole 21, the applicable side frame 15 is held by such a force that the side frame is unable to rotate insofar as by a stress that is imposed under an ordinary usage environment.

Next will be explained an operation of the seat-back Si according to various embodiments of the present invention upon rear-end collision, based on FIGS. 4A-5B.

FIG. 4A and FIG. 4B show states of the vehicle seat S before and during rear-end collision, respectively, and states of the connecting structure of the seat frame at these times are shown in FIG. 5A and FIG. 5B, respectively.

Upon rear-end collision, when a chest or upper torso portion of the occupant C is subjected to an impact from the rear and tends to move rearwardly due to inertia, this load strongly presses the seat-back Si, so that the applicable side frame 15 is rearwardly rotated together with the chest portion of the occupant C about the rotate shaft 28 as a rotation center.

The rearward rotational amount is preferably within a range of 5 to 25° which brings about no damage to another occupant C on a back seat.

In association with the rearward rotation of the side frame 15, the guide member 27 affixed to the side frame 15 is also rotated rearward. At this time, the fixed end 30a of the energy absorbing plate 30 located at the guide member 27 side and attached thereto, is pulled by the guide member 27 rotating together with the side frame 15.

In turn, the convex portion 26, which the energy absorbing plate 30 goes around, is fixed to the lower frame 17. As such, the energy absorbing plate 30 is caused to move upward, while that portion of the energy absorbing plate which is abutted to the convex portion 26 is plastically deformed by a counterload from the convex portion.

The deformation amount of the energy absorbing plate 30 that is brought about by the convex portion 26 is determined by a combination of a dimension of the energy absorbing plate 30, an outer diameter of the convex portion 26, an inner width of the guide member 27, and the like, and this embodiment is configured to adopt a combination involving a plastic deformation.

Since a larger energy is required to continuously and plastically deform the energy absorbing plate 30, it is possible to readily and effectively absorb an energy of rear-end collision, to thereby mitigate an impactive shock against a neck portion of the occupant.

Further, the energy absorbing plate 30 has outer peripheries at both sides constrained by the guide member 27 such that the curvature of the U-shape is unchanged even while that portion of the energy absorbing plate 30 which is abutted to the convex portion 26 undergoes deformation, so that the stress required for deforming the energy absorbing plate 30 is not changed.

Thus, the effect is that no deterioration occurs during rotation of the side frame 15.

Moreover, that location of the energy absorbing plate 30 which undergoes plastic deformation by the convex portion 26 is successively changed consonantly with the rotation of the side frame 15 such that no identical portions of the energy absorbing plate are deformed, so that fluctuation of deformation stress due to work hardening is not caused, thereby enabling to exhibit a continuous and stable energy absorbing effect.

The energy absorbing plate 30 in this embodiment at least has such a length that the energy absorbing plate forms a U-shape going around the convex portion 26 even after the side frame 15 is rearwardly rotated completely, so that the effect is never deteriorated during the rotation. Although this embodiment in an exemplary manner adopts the energy absorbing plate 30 in a rectangular shape, the shape of the energy absorbing plate 30 is not limited to being rectangular. Further, even when the energy absorbing plate 30 itself has a larger length which is not accommodated within the guide member 27, it is also possible to contain the energy absorbing plate 30 within the guide member 27 by forming the former into a state where the free end 30b is wound.

The shape, functions, and effects of the energy absorbing plate 30 are described below.

According to this embodiment, the guide member 27 is configured to be fixedly joined to the applicable side frame 15 such as by welding, and the fixed end 30a of the energy absorbing plate 30 is configured to be fixed to the guide member 27 by a screw (bolt and nut). However, it is also possible to adopt such a configuration to fix the guide member 27 to the side frame 15 by a screw or the like, or to affix the energy absorbing plate 30 to the guide member 27 by a method such as riveting or welding.

The above embodiment has been explained for an example where a mounting position of the configuration is located at an outside of the connecting structure 3 between the applicable side frame 15 and the lower frame 17. However, the mounting position is not limited to that in this embodiment, and may be located at a connecting structure 3 for the reclining mechanism 11, or at an inside of the connecting structure 3 between the applicable side frame 15 and the lower frame 17 of the vehicle seat S, and it is also possible to conduct modification accompanying to the change of the mounting position.

For example, when the configuration is to be mounted at an inside of the connecting structure 3 between the side frame 15 and lower frame 17 of the vehicle seat S, it is possible to adopt such a configuration to form a convex portion 26 at the side frame 15 side, and to provide, at the lower frame 17 side, an elongated hole 21, a guide member 27, and an energy absorbing plate 30 having one end affixed to the guide member 27.

Further, the first embodiment is configured such that the elongated hole 21 is provided at the rotating side (side frame 15 side) and the convex portion 26 is provided at the fixed side (lower frame 17 side). However, according to an embodiment modified in the above manner, the elongated hole 21 is configured to be provided at the fixed side (lower frame 17 side), and the convex portion 26 is configured to be provided at the rotating side (side frame 15 side).

In any one of the configurations, the elongated hole 21 and the convex portion 26 are required to be configured into an arrangement where they are relatively moved to each other.

Other examples, where the mounting positions of the configurations are modified, will be described hereinafter as a second embodiment and a third embodiment.

Second Embodiment

Figures 6A, 6B:
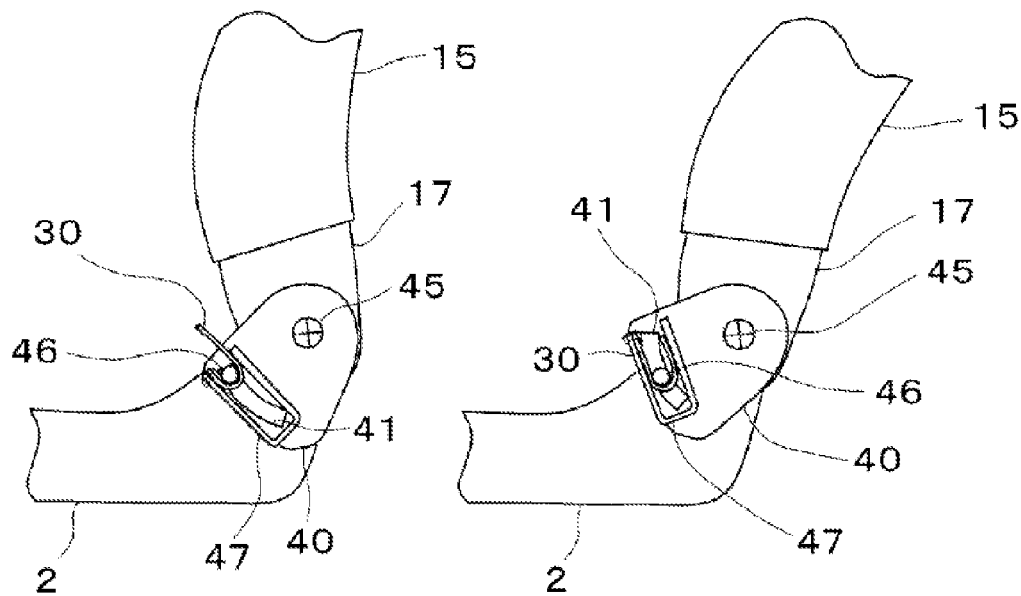
FIGS. 6A, B are partially enlarged explanatory side views of a coupling portion of a seating frame connected to a lower frame via connecting bracket according to a second embodiment of the present invention, before and after rear-end collision.

FIGS. 6A, B are partially enlarged explanatory views of a coupling portion of the seating frame 2 connected to the lower frame 17 via connecting bracket 40 according to a second embodiment of the present invention, before and during rear-end collision.

According to this embodiment, the side frames 15 are formed integrally with the lower frame 17, to form the seat-back frame 1 together with the upper frame 16. The seat-back frame 1 is rotatably supported by a rear end portion of the seating frame 2. Further, mounted on an outside of the lower frame 17 (lower end portion of the seat-back frame 1), is a connecting bracket 40 extended therefrom that overlaps with the rear end portion of the seating frame 2, such that the connecting bracket 40 is rotated integrally with the seat-back 51. Provided on the seating frame 2 at a location overlapped with the connecting bracket 40, is a convex portion 46, and the connecting bracket 40 side is formed with an elongated hole 41.

Similarly to the first embodiment, the elongated hole 41 is arcuate, and is formed to have a width slightly larger than an outer diameter of the convex portion 46. At an initial position, the convex portion 46 is arranged at an upper end portion of the elongated hole 41, so that the seat-back 51 rotatably and tiltably supported by a rotate shaft 45 is enabled to rotate rearward within an extent that the convex portion 46 is movable along the elongated hole 41 provided at the connecting bracket 40.

Fixedly joined to the connecting bracket 40 is a guide member 47 in a substantially rectangular channel shape having an open end directed upwardly in a manner to surround the elongated hole 41. Further, the energy absorbing plate 30 has its fixed end 30a affixed to an inside of the guide member 47 such that the energy absorbing plate 30 is disposed inside the guide member 47 in a manner to support, in an abutting manner, a relative moving direction end side of the convex portion 46 within the elongated hole 41, while extending the unfixed free end 30b in a direction opposite to a relative moving direction of the convex portion 46.

Although the convex portion 46 is affixed to the seating frame 2 and is thus immovable even when the seat-back 51 is rearwardly rotated upon rear-end collision, the guide member 47 is affixed to the connecting bracket 40 and is thus rotated together with the seat-back 51. At this time, the energy absorbing plate 30 having one end fixed to the guide member 47 abuts to the convex portion 46, and is caused to be pulled out upwardly while undergoing plastic deformation. It is possible at this time to effectively absorb energy upon rear-end collision, and to mitigate an impactive shock against a neck portion of an occupant.

Although this embodiment has been exemplified for a configuration where the connecting bracket 40 is mounted on the outside of the lower frame 17 (lower end portion of the seat-back frame 1), it is also possible that the connecting bracket 40 extended to overlap with the lower frame 17 is mounted on an outside of the rear end portion of the seating frame 2. In such a case, the convex portion 46 is provided at that location of the lower frame 17 which is overlapped with the connecting bracket 40, and the connecting bracket 40 side is formed with the elongated hole 41.

Further, although the above embodiments are so configured that the connecting bracket 40 formed with the elongated hole 41 is mounted on the outside of the seating frame 2 (or the lower frame 17), the connecting bracket may be mounted on an inside of the seating frame 2 (or lower frame 17). In this case, the convex portion 46 is provided at an inside of that location of the lower frame 17 (or seating frame 2) which is overlapped with the connecting bracket 40.

Third Embodiment

FIGS. 7A, B are side views showing states of a seating frame 2 side of a seat frame and a vehicle floor B side according to a third embodiment of the present invention, before and during rear-end collision.

The third embodiment includes: a convex portion 50 affixed to a front end portion of the outer rail 13b mounted on the seat leg portion while mounting a guide member 57 and the energy absorbing plate 30 on a supporting member 60 at the vehicle floor B side; and a rotate shaft 55 disposed at a rear end portion of the outer rail 13b.

The guide member 57 in a substantially rectangular channel shape is fixedly joined to the supporting member 60, while downwardly directing an open end of the guide member so as to movably guide the convex portion 50. Further, the energy absorbing plate 30 has its fixed end 30a affixed to an inside of the guide member 57 such that the energy absorbing plate 30 is disposed inside the guide member 57 in a manner to support, in an abutting manner, a moving direction end side of the convex portion 50, while extending the unfixed free end 30b in a direction opposite to a moving direction of the convex portion 50.

Upon rear-end collision, when the occupant C is subjected to an impact from the rearward and tends to move rearward due to inertia, those portions of the vehicle seat S above the slide rail 13 are rearwardly rotated around the rotate shaft 55 as a rotate center disposed at the rear end portion of the slide rail 13.

At this time, the convex portion 50 mounted to the front end portion of the slide rail 13 is upwardly moved while plastically deforming the energy absorbing plate 30 mounted to the vehicle floor B side and guided by the guide member 57, thereby enabling an absorption energy upon rear-end collision.

Although this embodiment has been exemplified for a configuration where the convex portion 50 is mounted to the outer rail 13b, it is also possible to mount the convex portion 50 to the vehicle floor B side. In such a case, the guide member 57 and the energy absorbing plate 30 are configured to be disposed at the front end portion of the outer rail 13b, and the convex portion 50 is configured to be formed at the vehicle floor B side.

Further, although this configuration is mounted to the outer rail 13b mounted at the seat leg portion in the above embodiments, the configuration may also be mounted to a leg connecting part 70 between the bottom of the seating frame 2 and the inner rail 13a.

Namely, it is also possible to adopt such a configuration that: the convex portion 50 is affixed to a front portion 70a of the leg connecting part 70 between the bottom of the seating frame 2 and the inner rail 13a; the energy absorbing plate 30 and the guide member 57 are mounted to the inner rail 13a side; and the rotate shaft 55 is disposed at a rear portion 70b of the leg connecting part 70 between the bottom of the seating frame 2 and the inner rail 13a.

In the aforementioned example where the configuration is mounted to the leg connecting part 70 between the bottom of the seating frame 2 and the inner rail 13*a*, it is of course possible to mount the convex portion 50 to the inner rail 13*a* side and to mount the guide member 57 to the leg connecting part 70 side. In this case, the guide member 57 and the energy absorbing plate 30 are configured to be disposed at the front portion 70*a* of the leg connecting part 70, and the convex portion 50 is configured to be formed at the inner rail 13*a* side.

Here, the energy absorbing plate 30 is explained in terms of shapes, functions, and effects.

FIGS. 8A-F are front views illustrating shapes for the energy absorbing plate 30.

The energy absorbing plate 30 is made of metal such as low-carbon steel or stainless steel, or made of a hard resin, and adjusts an amount of energy to be absorbed by the energy absorbing plate itself upon rear-end collision, by modifying a plate thickness, a plate width, and a material of the energy absorbing plate.

FIG. 8A is a front view of the energy absorbing plate 30 in a rectangular shape, as exemplified in the above described first through third embodiments, and FIG. 8B through FIG. 8F show other configurations of energy absorbing plates 30 having the same thickness.

FIG. 8B shows an energy absorbing plate 30 having a width proportionally narrowed from a fixed end 30*a* side toward a free end 30*b* side. This shape gradually narrows a width of the energy absorbing plate at a location abutted to the convex portion 26, 46, 50 and thus to be plastically deformed (plastically worked) upon rear-end collision. It is therefore possible to absorb a larger amount of energy by virtue of the plastic deformation of the larger width portion just after the collision where the collision energy is large, and thereafter, it is possible to gradually reduce the energy to be absorbed by virtue of the gradually narrowed width of the portion to be plastically deformed as the condition approaches a latter stage of the collision where the speed of the collision is lowered.

Namely, it is made possible that the energy to be absorbed is proportionally reduced commensurately with collision energy, thereby enabling to make relatively uniform the rotating speed of the seat-back S1.

FIG. 8C shows a shape of an energy absorbing plate which exhibits an effect opposite to that of FIG. 8B. Namely, this shape enables absorption of a larger amount of energy by the narrow width portion just after collision, while increasing the width of the energy absorbing plate as the condition approaches a latter stage of the collision, thereby enabling mitigation of an impactive shock that would otherwise be applied to an occupant C from the seat-back S1 just after the collision.

FIG. 8D shows another shape of an energy absorbing plate 30, which is formed to be stepwise narrowed in width from a fixed end 30*a* side to a free end 30*b* side. Explaining the shape of the energy absorbing plate 30 shown in FIG. 8D in more detail, the shape includes region L1, region L3, and region L5 having unchanged widths, respectively, and is formed to be stepwise narrowed in width, by connecting an upper end portion of the region L1 to a lower end portion of the region L3 (and an upper end portion of the region L3 to a lower end portion of the region L5) by a region L2 positioned between the region L1 and region L3 (and by a region L4 positioned between the region L3 and region L5).

This shape enables the stepwise absorption of energy correspondingly to the collision energy. As compared with the shape shown in FIG. 8B, this shape has a larger width of that portion to be plastically deformed just after collision, thereby enabling absorption of a larger amount of energy.

FIG. 8E shows a shape of an energy absorbing plate which exhibits an effect opposite to that of FIG. 8D. Namely, this shape enables absorption of a larger energy by the narrow width portion just after collision, while stepwise increasing the width of the energy absorbing plate as the condition approaches a latter stage of the collision, thereby enabling further mitigation of an impactive shock that would otherwise be applied to an occupant C from the seat-back S1 just after the collision.

It is also possible to exhibit an effect equivalent to that to be exhibited by a width change of an energy absorbing plate 30 by forming holes at arbitrary locations of the energy absorbing plate.

FIG. 8F shows an energy absorbing plate 30 formed with a larger number of holes at a free end 30*b* side while gradually decreasing the numbers (densities) of holes formed toward a fixed end 30*a* side, thereby enabling this design to exhibit the same effect as that of the energy absorbing plate 30 shown in FIG. 8D (or FIG. 8B) having the width stepwise (or proportionally) narrowed from the free end 30*b* side toward the fixed end 30*a* side.

It is further possible to arbitrarily change sizes and shapes of the holes.

The energy absorbing plates 30 having the shapes shown in FIG. 8A through FIG. 8F can be adopted in the first through third embodiments. Further, the energy absorbing plate 30 used is not limited to one in number, and it is possible to use energy absorbing plates 30 in the same shape or different shapes, by appropriately overlapping them with each other.

Although the constituent members have been mounted in one group in each of the first through third embodiments, it is possible to simultaneously mount multiple groups of constituent members.

The configuration is structured to absorb an energy by the energy absorbing plate 30, so that the configuration can be installed in a space-saving manner, and the configuration is simply established by a small number of parts, so that the configuration can be established in a light-weighted manner.

After a rear-end collision, the configuration can be readily repaired by replacing the energy absorbing plate itself having undergone plastic working or deformation, or by replacing the energy absorbing plate affixed to the guide member together with the guide member.

Further, it is possible to establish the configuration into an integrally formed assembly which can be mounted by a screw, rivet, or the like, thereby enabling mounting and repairing the configuration at a lower cost and in a simplified manner.

Table Of Reference Characters
S vehicle seat
S1 seat-back
S2 seating portion
S3 headrest
F seat frame
C occupant
B vehicle floor
1 seat-back frame
2 seating frame
3 connecting structure
11 reclining mechanism
13 slide rail
13*a* inner rail
13*b* outer rail
15 side frame
15*a* side plate
15*b* front edge 15c rear edge
16 upper frame
16a lateral side portion
17 lower frame
17a side plate
17b edge
17c rear plate
18 pillar supporting part
20 fitting hole
21, 41 elongated hole
21a arcuate portion
25 shaft member
26, 46, 50 convex portion
27, 47, 57 guide member
28, 45, 55 rotate shaft
30 energy absorbing plate
30a fixed end
30b free end
31 screw
40 connecting bracket
60 supporting member
70 leg connecting part
70a front portion
70b rear portion

The invention claimed is:

1. A vehicle seat comprising:
a seat frame comprising:
    side frames separated from each other at least in a right-and-left direction and extending in an up-and-down direction;
    a lower frame connected to the side frames; and
    a seating frame connected to the lower frame; wherein the side frames are disposed to be rotatable relative to the seating frame;
the vehicle seat further comprising:
a connecting structure formed at a position remote from a rotate center of the side frames at end sides thereof, wherein the connecting structure comprises:
    an elongated hole formed in the applicable side frame and extending in an up-and-down direction;
    a convex portion formed on the lower frame;
    an energy absorbing plate; and
    a guide member for guiding the energy absorbing plate, wherein the convex portion and the elongated hole are configured to be relatively movable, while plastically deforming the energy absorbing plate which is supported, in an abutting manner, by a seating frame side of the convex portion and which is disposed, in a clamped manner, between the convex portion and the guide member.

2. The vehicle seat of claim 1, wherein the energy absorbing plate is a metal plate configured to be plastically deformed by application of a rear-end collision load to the convex portion.

3. The vehicle seat of claim 1, wherein the energy absorbing plate is a metal plate which is made variable in absorption energy by varying at least one of a thickness, width, and material of the plate.

4. The vehicle seat of claim 1, wherein the energy absorbing plate is in a stepwise changed shape.

5. A vehicle seat comprising:
a seat frame having a seating frame;
a rotate shaft formed between a rear end side of a seating frame side and a vehicle floor side; and
a connecting structure formed between a front end side of the seating frame side and the vehicle floor side;
wherein the connecting structure comprises:
    a convex portion formed on the seating frame side;
    an energy absorbing plate; and
    a guide member fixed to the vehicle floor side to movably guide the convex portion;
wherein
    the convex portion is configured to be movably guided by the guide member, while plastically deforming the energy absorbing plate; and
    the energy absorbing plate is: a) supported, in an abutting manner, to a moving direction end side of the convex portion; and b) disposed, in a clamped manner, between the convex portion and the guide member.

6. The vehicle seat of claim 5, wherein the energy absorbing plate is a metal plate configured to be plastically deformed by application of a rear-end collision load to the convex portion.

7. The vehicle seat of claim 5, wherein the seating frame side is one of a leg portion for supporting the seating frame, and a slide rail at the seating frame side.

8. The vehicle seat of claim 5, wherein the energy absorbing plate is a metal plate which is made variable in absorption energy by varying at least one of a thickness, width, and material of the plate.

9. The vehicle seat of claim 5, wherein the energy absorbing plate is in a stepwise changed shape.

10. A vehicle seat comprising:
a seat frame comprising:
    side frames separated from each other at least in a right-and-left direction and extending in an up-and-down direction;
    a lower frame connected to the side frames; and
    a seating frame connected to the lower frame, wherein the side frames are disposed to be rotatable relative to the seating frame;
the vehicle seat further comprising:
a connecting structure formed at a position remote from a rotate center of the side frames at end sides thereof, wherein the connecting structure comprises:
    a convex portion formed on the applicable side frame;
    an elongated hole formed in the lower frame and extending in an up-and-down direction;
    an energy absorbing plate; and
    a guide member for guiding the energy absorbing plate, wherein the convex portion and the elongated hole are configured to be relatively movable, while plastically deforming the energy absorbing plate which is supported, in an abutting manner, by a seating frame side of the convex portion and which is disposed, in a clamped manner, between the convex portion and the guide member.

11. The vehicle seat of claim 10, wherein the energy absorbing plate is in a stepwise changed shape.

12. The vehicle seat of claim 10, wherein the energy absorbing plate is a metal plate configured to be plastically deformed by application of a rear-end collision load to the convex portion.

13. The vehicle seat of claim 10, wherein the energy absorbing plate is a metal plate which is made variable in absorption energy by varying at least one of a thickness, width, and material of the plate.

14. A vehicle seat comprising:
a seat frame comprising at least:
    a seat-back frame; and a seating frame connected to the seat-back frame through a connecting bracket, wherein the seat-back frame is disposed to be rotatable relative to the seating frame;

the vehicle seat further comprising:

a connecting structure formed at a position remote from a rotate center of the seat-back frame at an end side thereof, wherein the connecting structure comprises:

an elongated hole formed in the connecting bracket;

a convex portion formed on the seating frame;

an energy absorbing plate; and a guide member for guiding the energy absorbing plate, wherein the convex portion and the elongated hole are configured to be relatively movable, while plastically deforming the energy absorbing plate which is supported, in an abutting manner, by a moving direction end side of the convex portion and which is disposed, in a clamped manner, between the convex portion and the guide member.

15. The vehicle seat of claim 14, wherein the energy absorbing plate is a metal plate configured to be plastically deformed by application of a rear-end collision load to the convex portion.

16. The vehicle seat of claim 14, wherein the energy absorbing plate is a metal plate which is made variable in absorption energy by varying at least one of a thickness, width, and material of the plate.

17. The vehicle seat of claim 14, wherein the energy absorbing plate is in a stepwise changed shape.

18. A vehicle seat comprising:

a seat frame comprising at least:

a seat-back frame; and a seating frame connected to the seat-back frame through a connecting bracket, wherein the seat-back frame is disposed to be rotatable relative to the seating frame;

the vehicle seat further comprising:

a connecting structure formed at a position remote from a rotate center of the seat-back frame at an end side thereof, wherein the connecting structure comprises:

a convex portion formed on the connecting bracket;

an elongated hole formed in the seating frame;

an energy absorbing plate; and a guide member for guiding the energy absorbing plate, wherein the convex portion and the elongated hole are configured to be relatively movable, while plastically deforming the energy absorbing plate which is supported, in an abutting manner, by a moving direction end side of the convex portion and which is disposed, in a clamped manner, between the convex portion and the guide member.

19. The vehicle seat of claim 18, wherein the energy absorbing plate is a metal plate which is made variable in absorption energy by varying at least one of a thickness, width, and material of the plate.

20. The vehicle seat of claim 18, wherein the energy absorbing plate is in a stepwise changed shape.

21. The vehicle seat of claim 18, wherein the energy absorbing plate is a metal plate configured to be plastically deformed by application of a rear-end collision load to the convex portion.

22. A vehicle seat comprising:

a seat frame having a seating frame;

a rotate shaft formed between a rear end side of a seating frame side and a vehicle floor side; and a connecting structure formed between a front end side of the seating frame side and the vehicle floor side, wherein the connecting structure comprises:

a convex portion formed on the vehicle floor side;

an energy absorbing plate; and a guide member fixed to the seating frame side to movably guide the convex portion;

wherein the convex portion is configured to be movably guided by the guide member, while plastically deforming the energy absorbing plate; and the energy absorbing plate is: a) supported, in an abutting manner, to a moving direction end side of the convex portion; and b) disposed, in a clamped manner, between the convex portion and the guide member.

23. The vehicle seat of claim 22, wherein the seating frame side is one of a leg portion for supporting the seating frame, and a slide rail at the seating frame side.

24. The vehicle seat of claim 22, wherein the energy absorbing plate is a metal plate configured to be plastically deformed by application of a rear-end collision load to the convex portion.

25. The vehicle seat of claim 22, wherein the energy absorbing plate is a metal plate which is made variable in absorption energy by varying at least one of a thickness, width, and material of the plate.

26. The vehicle seat of claim 22, wherein the energy absorbing plate is in a stepwise changed shape.

* * * * *